United States Patent
McDowall et al.

(10) Patent No.: US 7,298,891 B2
(45) Date of Patent: Nov. 20, 2007

(54) BARE EARTH DIGITAL ELEVATION MODEL EXTRACTION FOR THREE-DIMENSIONAL REGISTRATION FROM TOPOGRAPHICAL POINTS

(75) Inventors: Tom McDowall, Melbourne, FL (US); Jake Auxier, West Melbourne, FL (US); Mark Rahmes, Melbourne, FL (US); Ray Fermo, Melbourne, FL (US)

(73) Assignee: Harris Corporation, Melbourne, FL (US)

( * ) Notice: Subject to any disclaimer, the term of this patent is extended or adjusted under 35 U.S.C. 154(b) by 735 days.

(21) Appl. No.: 10/891,950

(22) Filed: Jul. 15, 2004

(65) Prior Publication Data

US 2006/0013442 A1    Jan. 19, 2006

(51) Int. Cl.
 *G06K 9/00* (2006.01)
 *G06T 15/00* (2006.01)
 *G08B 23/00* (2006.01)
 *G01V 3/38* (2006.01)

(52) U.S. Cl. .................. 382/154; 382/109; 345/419; 345/420; 340/970; 702/5

(58) Field of Classification Search .......... 382/109, 382/154, 216, 241, 260, 266, 272, 275, 294, 382/295, 296, 305; 702/5, 6, 59; 703/6; 701/1, 4, 301; 345/419, 420, 421, 427; 356/12, 356/5.01; 324/543, 522, 523, 713, 525, 67; 341/26, 22; 451/5, 228, 49; 340/970; 715/964
See application file for complete search history.

(56) References Cited

U.S. PATENT DOCUMENTS

| 5,644,386 | A | * | 7/1997 | Jenkins et al. | 356/4.01 |
| 5,844,614 | A | | 12/1998 | Chong | |
| 5,875,108 | A | | 2/1999 | Hoffberg | |
| 5,901,246 | A | | 5/1999 | Hoffberg | |
| 5,988,862 | A | | 11/1999 | Kacyra | |
| 6,081,750 | A | | 6/2000 | Hoffberg | |
| 6,246,468 | B1 | | 6/2001 | Dimsdale | |
| 6,330,523 | B1 | | 12/2001 | Kacyra | |

(Continued)

OTHER PUBLICATIONS

J.A. Williams and M. Bennamoun, "Simultaneous Registration of Multiple Point Sets Using Orthonormal Matrices" Proc. IEEE ICASSP, Jun. 2000.

(Continued)

*Primary Examiner*—Sheela Chawan
(74) *Attorney, Agent, or Firm*—Allen, Dyer, Doppelt, Milbrath & Gilchrist, P.A.

(57) ABSTRACT

A method (300) for extracting a digital elevation model from a plurality of raw topographical points representing a plurality of frames representing a plurality of perspectives of a multi-dimensional object comprising a surface and above-surface obstructions, comprises steps or acts of: finding the surface (304) by filtering out data points produced by the above-surface obstructions to provide a plurality of surface data points representing the surface; and filtering the surface data points (306) with a competitive filter to provide a multi-dimensional surface shell of digital elevation model data points. The above-described method can also be carried out by a specialized or programmable information processing system (200) or as a set of instructions in a computer-readable medium such as a CD ROM or DVD or the like.

19 Claims, 3 Drawing Sheets

U.S. PATENT DOCUMENTS

| | | |
|---|---|---|
| 6,400,996 B1 | 6/2002 | Hoffberg |
| 6,405,132 B1 | 6/2002 | Breed |
| 6,418,424 B1 | 7/2002 | Hoffberg |
| 6,420,698 B1 | 7/2002 | Dimsdale |
| 6,473,079 B1 | 10/2002 | Kacyra |
| 6,512,518 B2 | 1/2003 | Dimsdale |
| 6,512,993 B2 | 1/2003 | Kacyra |
| 6,526,352 B1 | 2/2003 | Breed |
| 6,654,690 B2 * | 11/2003 | Rahmes et al. .............. 702/5 |
| 6,741,341 B2 * | 5/2004 | DeFlumere .............. 356/141.1 |
| 6,864,828 B1 * | 3/2005 | Golubiewski et al. .... 342/25 C |
| 7,046,841 B1 * | 5/2006 | Dow et al. ................. 382/154 |
| 7,242,460 B2 * | 7/2007 | Hsu et al. .................. 356/4.01 |
| 2002/0059042 A1 | 5/2002 | Kacyra |
| 2002/0145607 A1 | 10/2002 | Dimsdale |
| 2002/0149585 A1 | 10/2002 | Kacyra |
| 2002/0158870 A1 | 10/2002 | Brunkhart |
| 2003/0001835 A1 | 1/2003 | Dimsdale |

OTHER PUBLICATIONS

Created by John Pike, maintained by Steven Aftergood, "Interferometric Synthetic Aperture Radar (IFSAR) Shuttle Radar Topography Mission (SRTM)" Intelligence Resource Program, Feb. 25, 2000.

Dr. James E. Arnold, Lidar Tutorial, NASA, Aug. 2, 1999.

* cited by examiner

BARE EARTH DIGITAL ELEVATION MODEL EXTRACTION FOR THREE-DIMENSIONAL REGISTRATION FROM TOPOGRAPHICAL POINTS

CROSS-REFERENCE TO RELATED APPLICATIONS

This application relates to technology similar to that discussed in concurrently filed U.S. patent applications Ser. No. 10/892,047 entitled "METHOD AND SYSTEM FOR SIMULTANEOUSLY REGISTERING MULTI-DIMENSIONAL TOPOGRAPHICAL POINTS", Ser. No. 10/892,055 entitled "SYSTEM AND METHOD FOR IMPROVING SIGNAL TO NOISE RATIO IN 3-D POINT DATA SCENES UNDER HEAVY OBSCURATION", and Ser. No. 10/892,063 entitled "METHOD AND SYSTEM FOR EFFICIENT VISUALIZATION METHOD FOR COMPARISON OF LADAR POINT DATA TO DETAILED CAD MODELS OF TARGETS" which are assigned to the same assignee as the present application and are incorporated by reference herein in their entirety.

FIELD OF THE INVENTION

The invention disclosed broadly relates to the field of a digital signal processing of topographical data and more particularly relates to a system and method for extraction of digital elevation (DEM) models from a set of topographical points.

BACKGROUND OF THE INVENTION

Systems for processing digital representations of images are commonly used to process data representing surfaces such as DEMs. A DEM is digital map of the elevation of an area on the earth. The data is collected by any well-known means such as LADAR (imaging Laser RADAR), or by IFSAR (Interferometric Synthetic Aperture Radar) or the like. In operation, the LADAR instrument transmits light to a target. The transmitted light interacts with and is changed by the target. Some of this light is reflected or scattered back to the sensor of the instrument where it is detected, stored, and analyzed. The change in the properties of the light enables some property of the target to be determined. The time required for light to travel to the target and back to the LADAR instrument is used to determine the range to the target. IFSAR is used to ingest and process high-resolution elevation data produced through a technique called radar interferometry. As in the case of LADAR, IFSAR produces data useful for extracting DEMs.

Digital elevation models may be represented as a height map through gray scale images wherein the pixel values are actually terrain elevation values. The pixels are also correlated to world space (longitude and latitude), and each pixel represents some variable volume of that space depending on the purpose of the model and land area depicted.

Referring to FIG. 1 there is shown an example of an airborne LADAR system 100. The system comprises a LADAR instrument 102 mounted on the bottom of an aircraft 104. Below the aircraft is an area comprising the ground and a canopy formed by trees and other foliage obstructing the view of the ground (earth) from an aerial view. The LADAR instrument 102 emits a plurality of laser light pulses which are directed toward the ground. The LADAR instrument 102 comprises a sensor 103 that detects the reflections/scattering of the pulses. The LADAR instrument 102 provides data including elevation versus position information from a single image. It should be noted however, that multiple frames of portions of the area from different perspectives are used to generate the image. The tree canopy overlying the terrain results in significant obscuration of targets (e.g. tank 106) under that tree canopy. The points received by the sensor of instrument 102 from the ground and the target 106 are thus sparse. Hence, a robust system for processing the points is required. Moreover, to be of the most tactical and strategic value, an image of the ground wherein the target 106 can be perceived easily must be available quickly.

Extraction of data points generated by LADAR to produce a DEM is known. However, such methods are computationally intensive, and where a large number of data points are processed, run-time applications can be difficult or slow. Therefore, there is a need for more efficient methods and systems for production of DEMs using topological data points.

SUMMARY OF THE INVENTION

The above-discussed and other shortcomings of the prior art are addressed and overcome by the present invention which provides a method for extracting a digital elevation model from a plurality of raw topographical points representing a plurality of perspectives of a multi-dimensional object. The method comprises steps or acts of: finding a surface of the object by filtering out data points produced by above-surface obstructions to provide a plurality of surface data points representing the surface; and filtering the surface data points with a competitive filter to provide a multi-dimensional surface shell of digital elevation model data points. The above-described method can also be carried out by a specialized or programmable information processing system or as a set of instructions in a computer-readable medium such as a CD ROM or DVD or the like.

DETAILED DESCRIPTION

Figure 1:
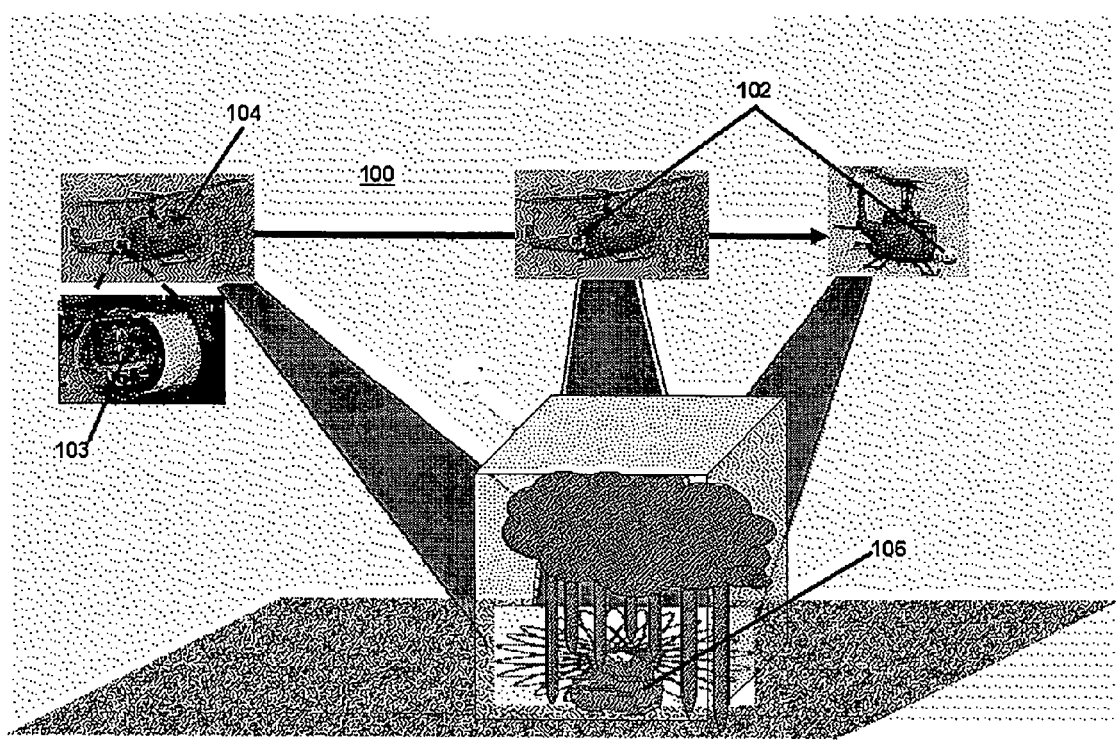
FIG. 1 is a depiction of an airborne LADAR instrument for processing images of a tree-covered terrain concealing a target.
Figure 2:
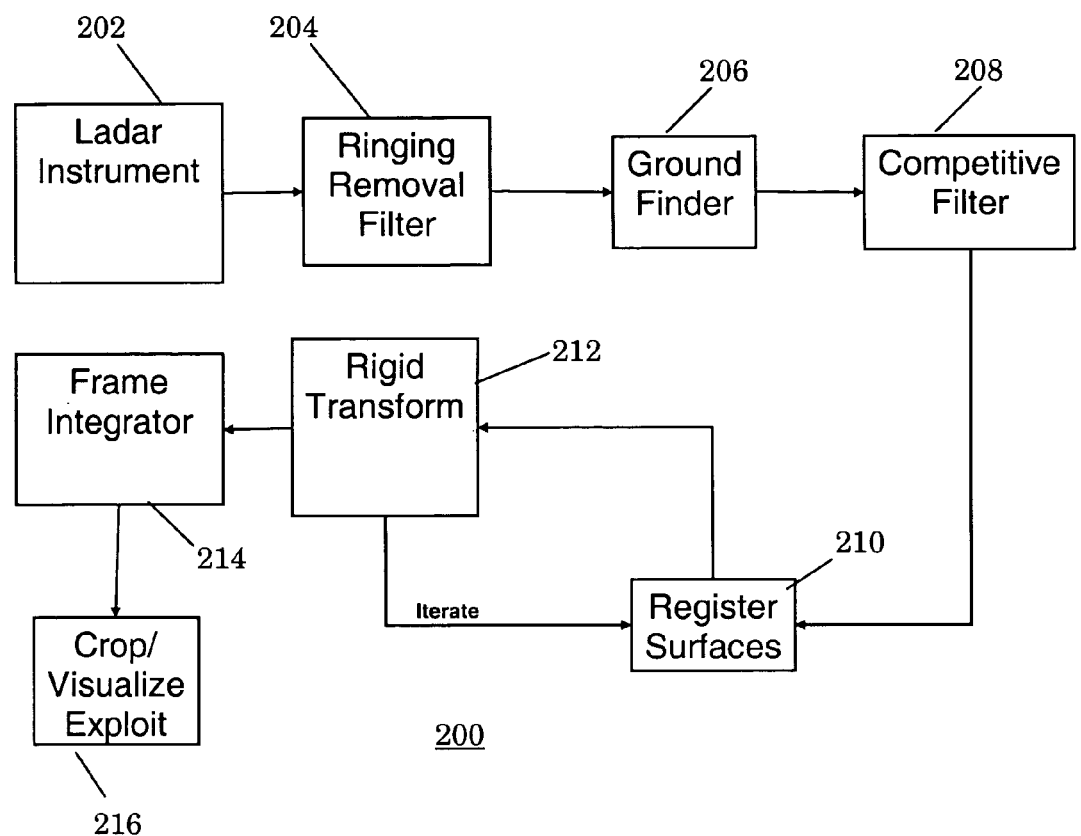
FIG. 2 is a high level block diagram showing an information processing system according to an embodiment of the invention.

Referring to FIG. 2, there is shown high level block diagram showing an information processing system 200 using an embodiment of the invention. The system 200 comprises a source 202 of topographical data points. These points are preferably a plurality of three-dimensional (3D) topographical point values provided by a LADAR instrument 102 as discussed with respect to FIG. 1.

Referring again to FIG. 2, the data source 202 creates, in a conventional manner, a plurality of frames (or volumes) comprising points representing a complex multidimensional object such as the terrain shown in FIG. 1. In this embodiment, the object comprises a base surface (e.g., the ground or earth) and a plurality of obstructions (e.g., tree tops) above the surface. Each frame comprises the points collected by the sensor 103 over a given period of time (an exposure) as the aircraft 104 moves over the terrain. In the preferred embodiment, this time period is one-third of a second and, with current instruments, that exposure results in collection of hundreds of thousands of points by the LADAR sensor 103. Each point is defined by a set of three-dimensional coordinates (x, y, z).

One way that the present system 200 improves on the performance of the prior art is, at least in part, by using only data points representing the ground surface and a target 106 (if present) and not the obstructions at a height greater than a predetermined threshold above the ground. Using only the ground points greatly reduces the number of points that are to be down-linked and processed and thus reduces the time required to produce a model of the terrain.

The data provided by the LADAR instrument 102 may comprise an effect known as ringing (or corona effect). Ringing is caused by scattering of the light produced by a target area that sometimes causes a false image to appear. A ringing removal filter (circuitry or program logic) 204 is used for filtering the received 3D topographical points to remove the ringing. Not all topographical data includes ringing. Therefore, the filer 204 is not always required. The ringing is removed by ignoring all data beyond a selected azimuth setting (for example), thus eliminating any false images. The selection of the azimuth setting is governed by statistical data or determined heuristically. In cases where the input comprises ringing, the use of the ringing removal filter 204 in system 200 increases the signal to noise ratio at the output of the filter 204.

The output provided by the ringing noise removal filter 204 is received at a ground finder 206. The ground finder 206 is used for finding a ground surface using the plurality of raw topographical points (e.g., from the LADAR instrument 102) and their coordinates and providing a plurality of ground points representing a plurality of frames, in turn representing patches of the ground surface and the target 106. The ground finder 206 finds the ground by extracting ground points from its input and filtering out points representing the obstructions such as those from the top of the trees. As expected, the number of LADAR pulses that reach the ground through the trees and other foliage is much smaller than those emitted by the LADAR source (or emitter). Therefore, the points of light representing the ground (ground points) detected at the LADAR sensor 103 is commensurately smaller than the total number received from the totality of the terrain below the aircraft 104.

The ground finder 206 thus extracts a ground surface shell (a set of points defining a three-dimensional surface) from the topographical data provided at the output of the ringing removal filter 204. The output of the ground finder 206 comprises a set of data representing the ground surface that includes the target 106.

The ground finder 206 also operates to make sure that the ground is continuous so that there are no large changes in the topography. This is accomplished by creating a two-dimensional (2D) grid for the ground surface and determining the height of the ground at each grid component. Each grid component preferably represents a square part of the ground that is one meter on each side. Once this data is collected for the entire grid, the ground finder 206 eliminates points that appear to be out of place or which are based on insufficient data. The decision on which points to eliminate is based on artifacts programmed into the ground finder 206. The ground finder 206 is further programmed to ignore any points higher than a predetermined height (e.g., the height of a person, such as six feet) when calculating the contour of the ground surface. The predetermined height is determined by rule-based statistics. That is done to eliminate any structures that are not likely to be part of the ground. Thus, the output of the ground finder 206 provides a more faithful representation of the actual ground surface than systems also using the treetop data.

The output of the ground finder 206 is provided to a competitive filter 208. The competitive filter 208 is used to work on the ground surface data (ground points) provided by the ground finder 206. The ground points are filtered using the competitive filter 208 to obtain a 3D shell of DEM points. The competitive filter 208 filters ground surface data not tied to geospatial coordinates such as the data collected by the LADAR instrument 202. The filter 208 works by performing a polynomial fit of predetermined order for each frame of data points. This is done by determining which polynomial best represents the set of points in the frame. One example is a first order polynomial (a tilted plane) and the other is a numeric average (zero order). In the preferred embodiment, the average and the tilted plane (respectively, zero and first order polynomials) compete for the best fit in any given frame or volume of points. Other embodiments may utilize higher order polynomials. A method for fitting polynomials in frames is discussed in U.S. patent application Ser. No. 09/827,305, the disclosure of which is hereby incorporated by reference in its entirety.

Thus, for every frame of points the filter 208 determines a tilted plane that fits the points in that frame. Each frame is a micro frame that covers a patch of ground constituting a small portion of the total area being processed. The output of the competitive filter 208 is a contour comprising a plurality of (e.g., thirty) planes, one for each frame acquired. An optimal estimate of the ground surface allows for obscuration by the trees and foliage to produce an image of a partially obscured target. Once each frame is processed by the filter 208 the output is an unregistered DEM surface. In this embodiment the surface is a ground surface, however it should be appreciated that the method and system of the invention can be used on any surface of a target object.

The data produced by the competitive filter 208 DEM is not suitable for rendering an image that is useful to a user of the system 200. To produce a viewable image we must first complete a registration process. In the preferred embodiment the registration is performed by an iterative process performed by blocks 210 (a registration engine) and 212 (a rigid transform engine). In this embodiment, to obtain a 3D representation of the ground surface, several sets of data (frames) are automatically pieced together to create an image of an entire target area or surface. Each set of data (or frame) is taken from a different perspective providing a different view of the surface features. Registration determines the relative positions of each of the points representing the surface as the sensor 103 moves over that surface. Thus different views of the surface area are aligned with each other by performing a translation and rotation of each frame to fit an adjacent frame or frames.

The first part of the registration process is to find in a second frame the closest point for each of a plurality of points in a first (adjacent) frame. Once the closest point is found, the points are aligned such that the frames make a good fit representing the registered model or image. This is known as a pair wise process. Each iteration of the process produces a better fit and the process continues until an optimum alignment is realized. This is accomplished by determining a computation cost associate with each rotation and translation of each frame to fit other frames. Using the information (matches between adjacent frames) collected in each iteration, subsequent iterations correct the alignment until an abort criterion is reached. This criterion can be the completion of a number of iterations or the accomplishment of a predetermined goal. In this embodiment, we perform the closest point search for each point in a first frame to locate closest points in at least one other frame by entering observations from each iteration into a matrix and then solving the matrix at once so that all transformations are performed substantially simultaneously (i.e., an n-wise process). An example of a matrix is found in J. A. Williams and M. Bennamoun, "Simultaneous Registration of Multiple Point Sets Using Orthonormal Matrices" Proc. IEEE Int. Conf. on Acoustics, Speech and Signal Processing (ICASSP June 2000) at pp. 2199-2202.

In the preferred embodiment the iterative process is repeated several (e.g., five) times to determine an optimum rotation and translation for the frames. We preferably use the algorithm presented in J. A. Williams and M. Bennamoun, "Simultaneous Registration of Multiple Point Sets Using Orthonormal Matrices" Proc. IEEE Int. Conf. on Acoustics, Speech and Signal Processing (ICASSP June 2000) at pp. 2199-2202, the disclosure of which is hereby incorporated by reference.

The iterated transformations discussed above are performed at block 212. Each transformation is a rigid transformation. A transform is said to be rigid if it preserves the distances between corresponding points.

The frame integrator block 214 performs an integration (or union) of the registered volumes produced by block 212 and the result is cropped to a size and shape suitable for presentation and then it is visually exploited at block 216 to show the structure of the target. The result is a 3D model that is displayed quickly. In the embodiment discussed herein a target such as the tank 106 hidden under the treetops as shown in FIG. 1 is depicted without the obscuring effect of the canopy of trees over the tank 106.

As discussed above, the speed of the registration process is critical in many applications such a locating a hidden target such as a tank 106 in a combat environment. One way to speed up the process is to improve the speed of the search for corresponding points from frame to frame. This can be accomplished by using any of several well-known k-D tree algorithms. Thus, the data points from each frame are mapped into a tree structure such that the entire set of points in an adjacent frame do not have to be searched to find the closest point for a given point in a first frame. An example of a k-D tree algorithm is found at the web site located at http://www.rolemaker.dk/nonRoleMaker/uni/algogem/kdtree.htm.

Figure 3:
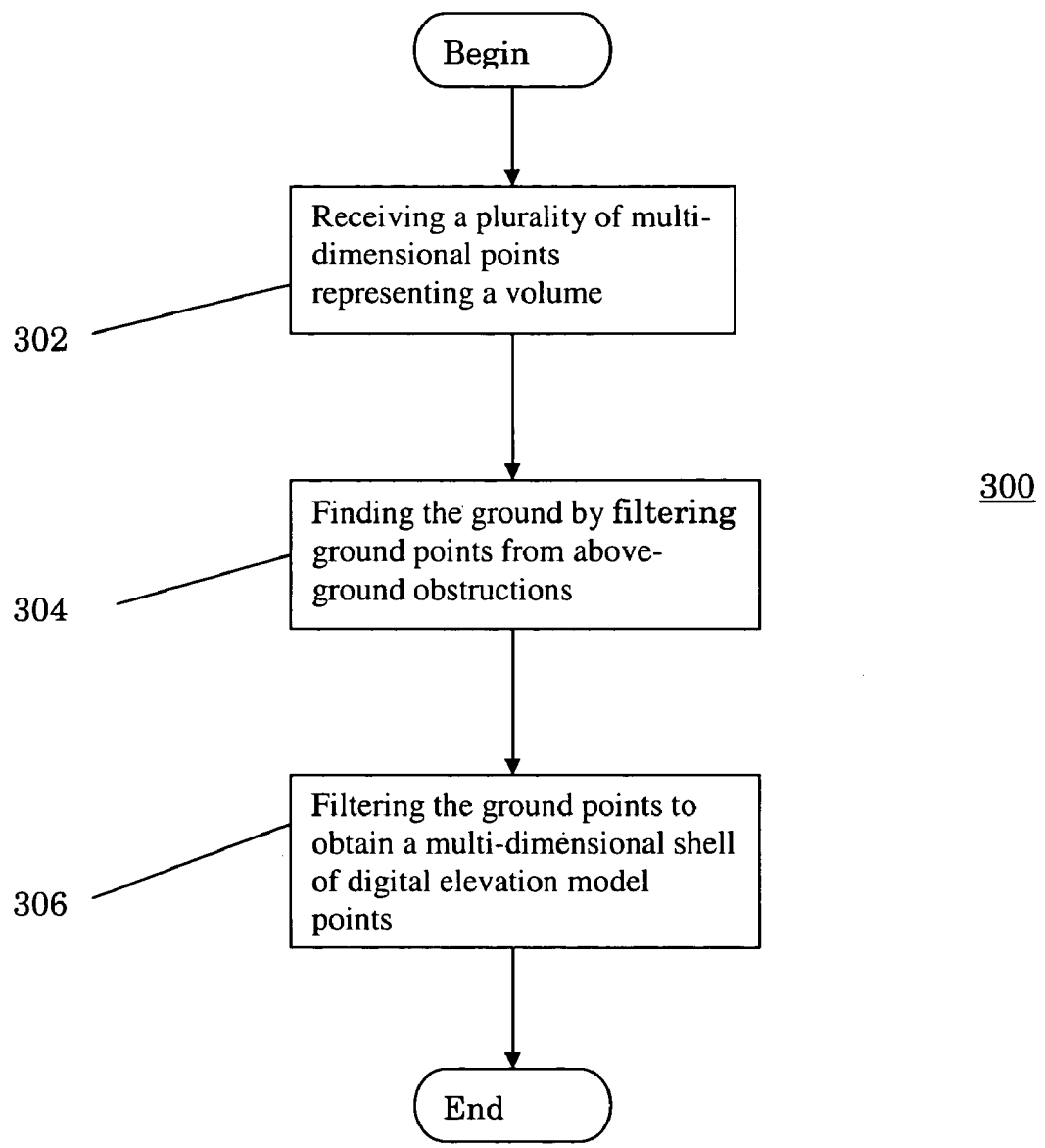
FIG. 3 is flowchart of a method for extracting a bare earth digital elevation model according to another embodiment of the invention.

Referring to FIG. 3, there is shown a flow chart illustrating a simplified method 300 for extraction of bare earth digital elevation model according to an embodiment of the invention. The method is performed using a system such as the one described with respect to FIG. 2. In step 302 the system receives a plurality of multi-dimensional points representing a frame volume. In step 304 the system finds the ground by isolating ground points from above-ground obstructions. In step 306 the system filters the ground points to obtain a multi-dimensional shell of digital elevation model points. The result of filtering is a DEM representing the ground area beneath the obstructions shown in FIG. 1. There are several possible applications for this output.

Therefore, while there has been described what is presently considered to be the preferred embodiment, it is understood by those skilled in the art that other modifications can be made within the spirit of the invention.

We claim:

1. A method for extracting a digital elevation model from a plurality of raw topographical points representing a plurality of frames, each frame representing a perspective of a multi-dimensional object comprising a surface and above-surface obstructions, the method comprising:
   finding the surface by filtering out data points representing the above-surface obstructions to provide a plurality of surface data points representing the surface; and
   filtering the surface data points with a competitive filter to provide a multi-dimensional surface shell of digital elevation model data points comprising a plurality of filtered frames.

2. The method of claim 1, wherein the filtering with the competitive filter comprises determining a plurality of tilted planes defining the surface.

3. The system of claim 1, wherein the topographical points comprise coordinates in three dimensions.

4. The method of claim 1, further comprising registering the plurality of filtered frames.

5. The method of claim 4, further comprising using an iterative closest point process for aligning data points in adjacent frames.

6. The method of claim 4, further comprising integrating the plurality of filtered frames for display thereof.

7. The method of claim 1, further comprising performing a k-D tree search for each of a plurality of points in a first frame to find a closest point in at least one adjacent frame.

8. A system for extracting a bare earth digital elevation model from a plurality of raw topographical points representing a multi-dimensional object comprising a surface and above-surface obstructions, the system comprising:
   a ground finder for finding a ground surface by receiving the plurality of raw topographical Points representing a plurality of frames, each frame representing a portion of the surface and filtering ground points from above-ground obstruction points to provide a plurality of ground points representing the ground surface; and
   a competitive filter for filtering the ground points to obtain a multi-dimensional shell of digital elevation model points.

9. The system of claim 8, further comprising registration logic for registering the shell of digital elevation model points.

10. The system of claim 8, wherein the ground finder finds the ground surface by processing ground points and clips every point above a predetermined threshold height.

11. The system of claim 8, wherein the multi-dimensional points comprise coordinates in three-dimensions.

12. The system of claim 8 further comprising a ringing noise removal filter for receiving the plurality of raw topographical points to remove any ringing effect in the raw topographical points and to provide a signal with improved signal to noise ratio to the ground finder.

13. The system of claim 8 further comprising a LADAR sensor for receiving points of light reflected or scattered by a subject surface and providing the plurality of topographical points.

14. The system of claim 8 further comprising a LADAR source for emitting pulses of light to the surface.

15. The system of claim 8 further comprising an IFSAR instrument for receiving data points produced by a subject surface and providing the plurality of topographical points.

16. A computer readable medium comprising program instructions for extracting a digital elevation model from a plurality of raw topographical points representing a plurality of frames representing a plurality of perspectives of a multi-dimensional object comprising a surface and above-surface obstructions, the medium comprising instructions for:
   finding the surface by filtering out data points produced by the above-surface obstructions to provide a plurality of surface data points representing the surface; and
   filtering the surface data points with a competitive filter to provide a multi-dimensional surface shell of digital elevation model data points comprising a plurality of filtered frames.

17. The medium of claim 16 further comprising an instruction for registering the shell of digital elevation model points.

18. The medium of claim 16 further comprising an instruction for using an iterative closest point algorithm.

19. The medium of claim 16 further comprising an instruction for using a fast KD Tree search on adjacent collected pairs of surface shells finding rotation and translation parameters that are optimal for the current iteration.

* * * * *

UNITED STATES PATENT AND TRADEMARK OFFICE
CERTIFICATE OF CORRECTION

PATENT NO. : 7,298,891 B2  
APPLICATION NO. : 10/891950  
DATED : November 20, 2007  
INVENTOR(S) : McDowall et al.

Page 1 of 1

It is certified that error appears in the above-identified patent and that said Letters Patent is hereby corrected as shown below:

| | |
|---|---|
| Column 2, Line 43 | Delete: "is flowchart"<br>Insert: -- is a flowchart -- |
| Column 3, Line 15 | Delete: "filer"<br>Insert: -- filter -- |
| Column 5, Line 14 | Delete: "transform"<br>Insert: -- transformation -- |
| Column 5, Line 26 | Delete: "such a"<br>Insert: -- such as -- |
| Column 6, Line 21 | Delete: "Points"<br>Insert: -- points -- |

Signed and Sealed this

Fifth Day of August, 2008

JON W. DUDAS  
*Director of the United States Patent and Trademark Office*